(12) United States Patent
Malmberg et al.

(10) Patent No.: US 9,201,818 B2
(45) Date of Patent: Dec. 1, 2015

(54) INTERFACE MODULE FOR HW BLOCK

(75) Inventors: Magnus Malmberg, Södra Sandby (SE); Michael Breschel, Lund (SE); Toni Brkic, Staffanstorp (SE); Christel Bergh, Södra Sandby (SE); Satbinder Singh Ram, Herlev (DK)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 227 days.

(21) Appl. No.: 14/116,604

(22) PCT Filed: May 10, 2012

(86) PCT No.: PCT/EP2012/058613
§ 371 (c)(1),
(2), (4) Date: Feb. 24, 2014

(87) PCT Pub. No.: WO2012/152856
PCT Pub. Date: Nov. 15, 2012

(65) Prior Publication Data
US 2014/0201392 A1    Jul. 17, 2014

Related U.S. Application Data

(60) Provisional application No. 61/485,175, filed on May 12, 2011.

(30) Foreign Application Priority Data

May 11, 2011  (EP) .................................... 11165722

(51) Int. Cl.
*G06F 3/00* (2006.01)
*G06F 13/16* (2006.01)
(Continued)

(52) U.S. Cl.
CPC ............. *G06F 13/16* (2013.01); *G06F 13/102* (2013.01); *G06F 13/385* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS 5,493,239 A   2/1996   Zlotnick
5,497,501 A   3/1996   Kohzono et al.
(Continued)

FOREIGN PATENT DOCUMENTS

WO   2006048826 A1   5/2006
WO   2008014493 A2   1/2008

OTHER PUBLICATIONS

"I2O." HDK Technical Reference. 4 pages. The SCO Group, Inc. 2005. Accessed online Jan. 26, 2015, at http://osr600doc.sco.com/en/HDK_concepts/ddT_I2O.html.
(Continued)

*Primary Examiner* — Elias Mamo
(74) *Attorney, Agent, or Firm* — Coats & Bennett, P.L.L.C.

(57) ABSTRACT

An interface module for a logic circuit block comprising a processing module, the interface module comprising a control interface for communicating one or more control messages; a data interface for accessing a data storage device; an interface logic block; and a core interface to the processing module, the core interface being connected to the interface logic block for communicating signals between the interface logic block and the processing module. The interface logic block is adapted to receive one or more incoming control message via the control interface; process the one or more control messages including accessing a data storage device via the data interface, initiating processing by the processing module via the core interface, receiving one or more signals from the processing module via the core interface; and to output one or more outgoing control message via the control interface.

15 Claims, 2 Drawing Sheets

(51) Int. Cl.
  *G06F 13/38* (2006.01)
  *G06F 13/10* (2006.01)

(56) References Cited

U.S. PATENT DOCUMENTS

| | | | |
|---|---|---|---|
| 5,838,167 A | 11/1998 | Erickson et al. | |
| 5,845,072 A | 12/1998 | Finney et al. | |
| 6,044,025 A | 3/2000 | Lawman | |
| 6,049,222 A | 4/2000 | Lawman | |
| 6,216,191 B1 * | 4/2001 | Britton | G06F 13/385 326/34 |
| 6,816,938 B2 | 11/2004 | Edara et al. | |
| 7,124,391 B1 * | 10/2006 | Patterson | G06F 17/5054 716/117 |
| 7,707,334 B2 | 4/2010 | Wang et al. | |
| 7,743,176 B1 * | 6/2010 | Turney | G06F 13/28 709/212 |
| 7,836,240 B2 | 11/2010 | Schoegler | |
| 2004/0189495 A1 | 9/2004 | Wu | |
| 2005/0027836 A1 * | 2/2005 | Nishihara | G06F 15/7867 709/223 |
| 2008/0147923 A1 * | 6/2008 | Renahy | G06F 13/4059 710/62 |
| 2009/0013170 A1 | 1/2009 | Becker et al. | |
| 2010/0312418 A1 | 12/2010 | Kraft et al. | |

OTHER PUBLICATIONS

Kotzsch, V., et al. "Reusable Design of Inter-chip Communication Interfaces for Next Generation of Adaptive Computing Systems." ARCS 2005, LNCS 3432. Beigl and Lukowicz, eds. pp. 167-177. 2005. Springer-Verlag, Berlin, Germany.

* cited by examiner

INTERFACE MODULE FOR HW BLOCK

TECHNICAL FIELD

Disclosed herein is an interface module for a HW block for a processing device.

BACKGROUND

Many digital logic circuits have a modular design comprising a plurality of logic circuit blocks each implemented in hardware (HW). A logic circuit block may be designed using a hardware description language such as VHDL or Verilog. A logic circuit block typically has an interface for control data and an interface for data access. In addition to that, one or several specific interfaces may exist for direct access to other logic circuit blocks, external interfaces or processing blocks adapted to execute software (SW), like CPUs, DSPs or sequencers. For the purpose of the present description, a logic circuit block of a digital logic circuit implemented in hardware will also be referred to as a HW block.

The configuration of a logic circuit block is normally done by software running on a CPU, DSP, Sequencer or similar processing unit. The configuration parameters are sent to the logic circuit block on the control interface. When the configuration of the logic circuit block is finished it is started by software and executes either continuously or until done, depending on the function that the logic circuit block implements. When the logic circuit block is done, it may inform the software entity by sending an interrupt or by writing to a status bit that can be read by SW.

Hence, the HW block normally needs to be configured and started by SW, and when a HW block is done it needs to signal to the SW that it is done using an interrupt, a SW polling mechanism, or another method. This results in the SW receiving a high interrupt load and/or in the need for polling of HW block status registers by SW and/or that the SW has a good timing understanding of the system, e.g. knowing when the HW blocks are done and when the result from one HW block can be used by SW or by another HW block.

In real-time systems such as communications devices, it can be difficult for the SW entity to perform the programming of the HW entities at the correct time, which often leads to over-dimensioning of HW entities, SW entities and/or interface HW when it comes to performance to secure that the real time constraints in the system are not broken.

WO 2008/014493 shows an accelerator module referred to as a reconfigurable processor unit (RPU), which may be coupled to a motherboard. The RPU may access system memory that is also accessible by a microprocessor. The RPU includes an FPGA in which a user available programmable logic fabric may be coupled via a wrapper interface to memories external to the FPGA. The FPGA can be re-programmed by having one or several bit streams for doing the re-programming stored in memory and a controller for controlling the actual reconfiguration.

It is thus generally desirable to provide HW blocks that reduce the interrupt intensity of a system comprising such HW blocks.

It is further generally desirable to provide HW blocks that are easily (re-)configurable.

It is further generally desirable to provide HW blocks that are power efficient.

SUMMARY

Disclosed herein are embodiments of an interface module for a logic circuit block, the logic circuit block comprising a processing module. Embodiments of the interface module comprise:

a control interface for communicating one or more control messages;
a data interface for accessing a data storage device, e.g. a memory or memory system;
an interface logic block connected to the control interface and to the data interface;
a core interface to the processing module, the core interface being connected to the interface logic block for communicating signals and/or parameters between the interface logic block and the processing module;

wherein the interface logic block is adapted to receive one or more incoming control messages via the control interface; process the control message including accessing a data storage device via the data interface; initiating processing by the processing module via the core interface; receiving one or more signals from the processing module via the core interface; and to output one or more outgoing control message, e.g. to another logic circuit block, via the control interface. For example, the interface module may be configured to send data on a master port of the control interface, based on information from the processing module and/or information from the data storage device received via the data interface.

Embodiments of the interface module described herein provide a flexible, reconfigurable system and a low interrupt intensive system. In particular, as the interface module is configured to start the execution of the HW block, to receive a response when done, and to direct outgoing messages to other logic circuit blocks, a low interrupt intensive system is provided. When one HW block is finished the interface module can start the next HW block based on configuration data in memory but without any need for SW involvement.

In some embodiments, the interface module is adapted to read one or more configuration parameters for configuring the logic circuit block from a data storage device via the data interface, thus allowing the configurations to be preloaded into memory and loaded and used by the logic circuit block responsive to a control message received by the interface module via the control interface.

In some embodiments the interface module is configured to send data via the control interface, the data comprising information read from the data storage device, thereby allowing the interface module to communicate configurable data to other hardware blocks, thus increasing the flexibility of the system. In particular, the interface module may capture configuration data for the HW block with little or no involvement of any SW blocks. For example, the interface module may read data from memory to be sent on the control interface master port, and the data to be sent on the control interface can be configured during setup time or at run-time by other blocks of a processing system.

In some embodiments, the interface module comprises one or more buffers for queuing control messages addressed to the logic circuit block and received via the control interface.

In some embodiments the interface module is configured to activate the processing module responsive to a receipt of a control message addressed to the logic circuit block. In some embodiments, the interface module is configured to deactivate the processing module when the processing module is inactive, thus reducing the power consumption of the logic circuit block.

Generally, embodiments of the interface module described herein provide a uniform and automated interface to a HW block with access to both the control interface and the data interface and with a set of functions, thus providing a uniform interface and uniform interface capabilities for the control of different HW blocks which makes the addition and/or removal of HW blocks from a system easy without the need for major HW re-design.

The present invention relates to different aspects including the interface module described above and in the following, corresponding logic circuit blocks, processing devices, and further apparatus, methods, systems, and products, each yielding one or more of the benefits and advantages described in connection with one of the above-mentioned aspects, and each having one or more embodiments corresponding to the embodiments described in connection with at least one of the above-mentioned aspects.

In particular, disclosed herein are embodiments of a logic circuit block comprising a processing module and an interface module as described herein. Further disclosed herein are embodiments of a processing device comprising one or more such logic circuit blocks. The term processing device is intended to comprise any electronic device comprising processing means for data processing. In particular, the term processing device is intended to comprise any electronic equipment, portable radio communications equipment, and other handheld or portable devices, and integrated circuits, microprocessors, chips or chipsets for use in such equipment. The term portable radio communications equipment includes all equipment such as mobile terminals, e.g. mobile telephones, pagers, communicators, electronic organisers, smart phones, personal digital assistants (PDAs), handheld computers, or the like.

In some embodiments, a processing device comprises a processing unit operable to execute software and connected to a control bus and to a data storage device (e.g. via a memory bus), and one or more logic circuit blocks as described herein, each logic circuit block being connected to the control bus and to the data storage device.

BRIEF DESCRIPTION OF THE DRAWINGS

The above and other aspects will be apparent and elucidated from the embodiments described with reference to the drawing in which.

DETAILED DESCRIPTION

Figure 1:
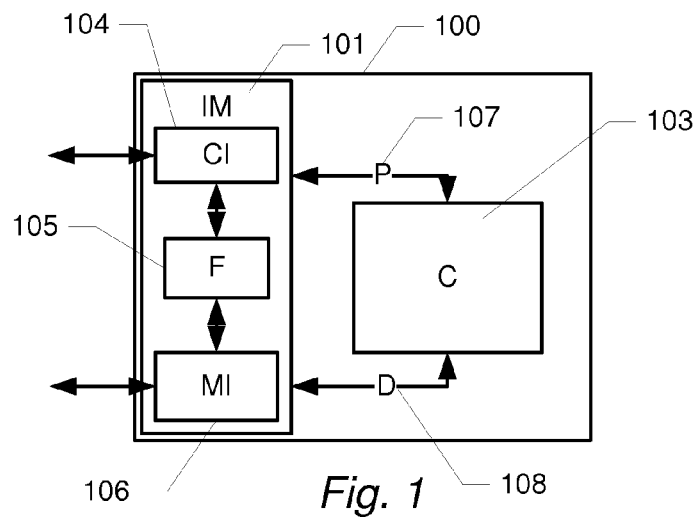
FIG. 1 shows a schematic block diagram of an embodiment of a logic circuit block.

FIG. 1 shows a schematic block diagram of an embodiment of a logic circuit block. The logic circuit block, generally designated 100, comprises a hardware block core 103 and an interface module 101. The hardware block core 103 is configured to provide the core logic functionality of the logic circuit block, e.g. facilitating certain data processing, while the interface module is operable to provide a uniform interface to the HW block core.

The interface module 101 comprises a control interface 104 a data interface 106 allowing the logic circuit block 100 to receive and/or output control messages and data, respectively, from entities external to the logic circuit block 100. For example, the control interface 104 may be connectable to a control bus of a processing device, e.g. a ring bus or another suitable bus. Similarly the data interface may be connectable to a memory bus, thus allowing data exchange with a common memory or other data storage device of the processing device.

The interface module 101 further comprises one or more interfaces to the HW block core 103. In the example of FIG. 1, the interface module comprises an interface 107 for exchanging parameters with the HW block core and an interface 108 for exchanging data with the HW block core. The interface 107 may include communication between the interface module and the core. The interface 108 is connected to the data interface and may be connected to the interface module or directly to the data interface. In particular, it may be interesting to note that data bus may be connected to a memory interface outside the interface module and that the traffic to the memory system may be merged between the memory in the interface module and the memory interface from the HW block core via an arbiter or similar. The HW block core logic may make use of the control bus access capabilities of the interface module which may provide functions for sending and receiving control message via the interface module. The HW block core may access suitable registers on the interface module. It will be appreciated, however, that alternative or additional interfaces to read and/or write registers may be provided. The core interface of the interface module may further comprise respective ports for communicating core start signals to and for receiving core events from the HW block core.

The interface module 101 further comprises a logic block 105 operable to provide a set of logic functions.

The logic circuit block 100 (e.g. the interface module 101) may comprise further interfaces, e.g. an interface to a system clock.

Figure 2:
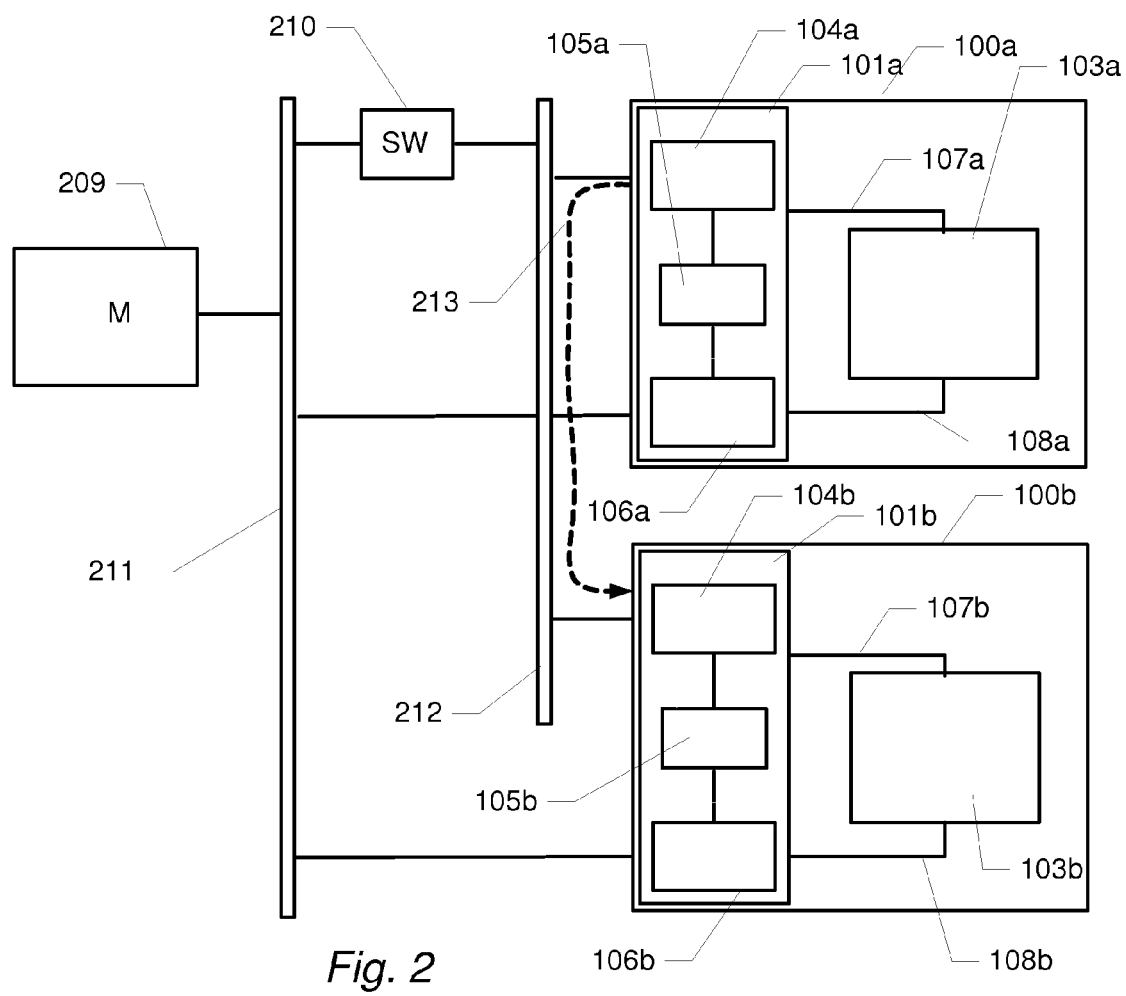
FIG. 2 shows a schematic block diagram of an embodiment of processing device comprising two logic circuit blocks.

FIG. 2 shows a schematic block diagram of an embodiment of processing device comprising two logic circuit blocks. The processing device of FIG. 2 comprises a first logic circuit block 100*a* (in the following referred to as HW block A) and a second logic circuit block 100*b* (in the following referred to as HW block B). Each logic circuit block may be a logic circuit block as described above with reference to FIG. 1. In particular, HW block A may comprise a HW block core 103*a* and an interface module 101*a* connected to the HW block core 103*a* via one or more core interfaces (e.g. core interfaces 107*a* and 108*a*). The interface module 101*a* comprises a control interface 104*a*, a data interface 106*a* and a logic block 105*a*, all as described in connection with FIG. 1. Similarly, HW block B may comprise a HW block core 103*b* and an interface module 101*b* connected to the HW block core 103*b* via one or more core interfaces (e.g. core interfaces 107*b* and 108*b*). The interface module 101*b* comprises a control interface 104*b*, a data interface 106*b* and a logic block 105*b*, all as described in connection with FIG. 1.

The processing device further comprises a SW block 210, e.g. a central processing unit, a digital signal processor, a sequencer, or the like, and a memory 209 or another suitable data storage device. The interface modules 101*a* and 101*b* are connected, via their respective control interfaces 104*a* and 104*b*, to a control bus 212. The SW block 210 is also connected to the control bus 212. Similarly, the interface modules 101*a* and 101*b* are connected, via their respective data interfaces 106*a* and 106*b*, to a memory bus 211 to which also the memory 209 and the SW block 210 are connected.

Even though the processing device of FIG. 2 comprises only two logic circuit blocks, each comprising an interface module as disclosed herein, it will be appreciated that alternative examples of processing devices may comprise a different number of logic circuit blocks as described herein. It will further be appreciated that a processing device may comprise additional components not explicitly shown in FIG. 2.

The memory 209 may have stored therein respective configuration parameters for HW blocks A and B, e.g. generated and stored in the memory by the SW block 210.

During operation, the processing device may perform the following steps:

1) SW block 210 may start operation of HW block A by sending a control message to HW block A via control bus 212.
2) Interface module 101a may receive the control message via control interface 104a and forward the control message to logic block 105a. For example, the control message may include a memory address where the configuration parameters for configuring HW block A are stored.
3) Logic block 105a may be operable to decode the received control message and, responsive to the received control message, read the configuration parameters from memory 209 via the memory bus 211 and the data interface 106a.
4) Upon completion of the configuration, the interface module 101a may start the HW block core 103a, e.g. by sending a start signal to the HW block core 103a via the core interface, thus causing the HW block core 103a to perform its function(s).
5) When the HW block core 103a is done, the HW block core 103a signals to the interface module 101a, e.g. by a suitable event.
6) The interface module 101a may then, responsive to the configuration parameters read from memory, send a message to the HW block B on the control interface 104a, as illustrated by the dashed arrow 213 in FIG. 2.
7) The interface module 101b receives the message via the control bus 212 and the control interface 104b and initiates a corresponding configuration and start of the HW block core 103b, i.e. the HW block B may perform steps corresponding to steps 2)-5) above.
8) The interface module 101b of HW block B may forward another message to another HW block, e.g. HW block A, or HW block B may send a message to the SW block 210 so as to indicate that HW block B is done, e.g. by sending an interrupt.

As will be apparent from the above description, embodiments of the interface module described herein secure that all HW blocks have a uniform interface and provide uniform capabilities for the control of all the HW blocks. Moreover, embodiments of the interface module described herein reduce the interrupt rate since one HW block can start the next one instead of signalling an interrupt to the SW block so as to cause the SW block to start the next HW block.

It will be appreciated that the above described control process may also be implemented in the case of more than two HW blocks. Furthermore, it will be appreciated that the order in which the HW blocks are started may easily be defined (and changed) by changing the configuration parameters in memory. For example, in the example of FIG. 2, the processing device may be configured to initially configure HW block A as described above. Upon completion, HW block A may send a control message to HW block A, thus causing HW block A to perform a second configuration and to start the HW block core of HW block A, e.g. followed by sending a control message to HW block B causing configuration and start of HW block B. In some embodiments, the result of the first processing of HW block A may impact the next activity, e.g. by having two or more configurations prepared in memory and, depending on the result of the first execution of HW block A, reconfigure the configurations placed in memory.

In some embodiments the interface logic block may include functionality for queuing of events/control messages, e.g. by providing a FIFO buffer for incoming control messages. This allows a similar reconfiguration as described above to be performed in a different way; it also allows several sequences to execute in parallel.

Hence, in this example, the SW block 210 may configure the two HW blocks with two configurations for HW block A and one configuration for HW block B in memory. The SW block 210 may start the HW block A twice, first with a control message for a first configuration and secondly with a control message for the second configuration. The interface module 101a queues the control messages in a buffer, reads the first configuration from memory and starts the HW block core of HW block A when the configuration is done. Upon receipt of a signal from HW block core 103a that HW block core 103a is done, interface module 101a may read in the queuing control message, set up the second configuration and perform the corresponding activities as for the first configuration of HW block A. Upon receipt of a signal from HW block core 103a that HW block core 103a is done with the execution based on the second configuration, interface module 101a may send a control message to HW block B which in turn reads in its configuration from memory as described in the previous examples.

Hence, embodiments of the interface module which include a set of functions for receiving and sending control messages, reading configuration parameters and starting the HW block core, provide a flexible and reconfigurable system.

It will further be appreciated that embodiments of the interface module described herein may allow the HW block core to be inactivated, considering clock and/or power, and activated only when needed. Such selective activation thus results in a power efficient system.

An example of such a selective activation process may comprise the following steps:

1) The HW block core is inactive
2) The interface module receives a control message causing the interface module to active the HW block core.
3) The HW block core is activated by the interface module, optionally utilising external signals such as a clock or power request signal.
4) The HW block core is active and may be configured and controlled to start execution as described above.
5) The HW block core signals to the interface module when it is done.
6) The interface module checks if any control messages are queued in the message buffer of the interface module; if no messages are queuing the interface module inactivates the HW block core.

Figure 3:
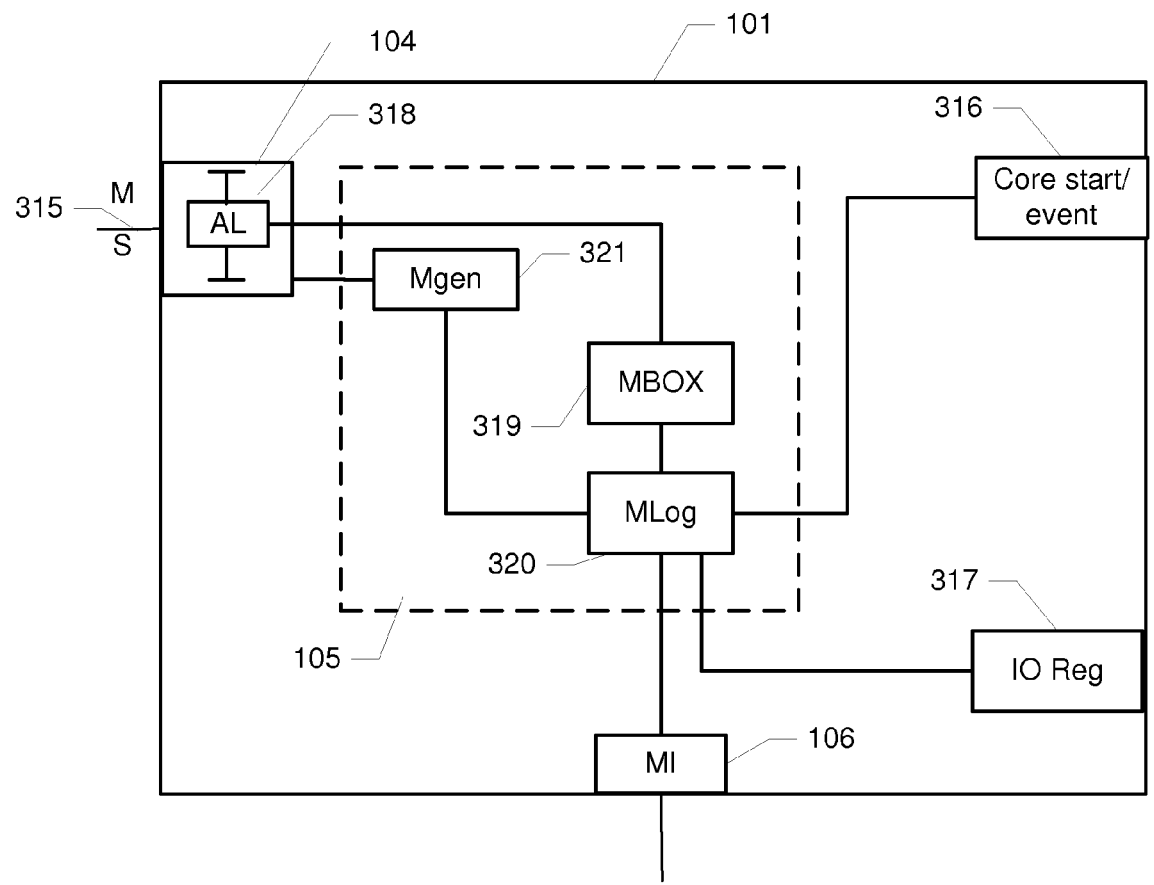
FIG. 3 shows a schematic block diagram of an embodiment of an interface module for a logic circuit block.

FIG. 3 shows a more detailed schematic block diagram of an embodiment of an interface module for a logic circuit block. The interface module 101 may e.g. be used as interface module of the logic circuit blocks shown in FIGS. 1 and 2, and provides components and functionality to perform the flexible configuration and execution by HW blocks described above.

The interface module 101 comprises a control interface 104, a data interface 106, core interfaces 316 and 317, and interface logic 105.

The control interface 104 provides an interface to a control bus 315 with both master and slave port. The control interface is operable to receive incoming and to send outgoing messages, via the control bus. The control interface may implement the transport layer of a control bus. If the interface module 101 is operable to activate and inactivate the logic circuit block in which it resides responsive to the presence of pending incoming messages, the receipt of an incoming message may trigger a power and/or clock ON of the hardware block core (not explicitly shown in FIG. 3) and, optionally, of the remaining components of the interface module.

The interface logic 105 comprises a FIFO buffer 319, a message decoding and processing logic block 320, and a message send handler 321.

The FIFO buffer 319 is operable to provide a mail box for incoming messages in which incoming messages are queued. Even though the interface module shown in FIG. 3 only comprises a single such mail box, it will be appreciated that alternative embodiments of an interface module may comprise more than one mail box for queuing incoming control messages, thus facilitating a multi-threaded operation. For example, the interface module may comprise a system of mailboxes having different priorities.

The interface module may comprise a mailbox handler circuit (not explicitly shown) comprising FIFO logic for all mail boxes of the interface module, e.g. with one FIFO per mail box. The FIFOS may be implemented with one memory for all FIFOS. The mailbox handler may use a two port memory as mailbox memory. The mail box memory can both be read and written at the same time. Upon receipt of a message, the control interface 104 may signal towards the mail box handler when a mail shall be written into the mailbox, and the mail box handler manages the writing of an incoming mail. Similarly upon a request by the message decoding and processing logic the mailbox handler may control the reading of the next mail from the buffer.

The message decoding and processing logic 320 is operable to read messages from the buffer 319, decode a message body of the incoming message, and initiate corresponding message processing by the interface module and/or the HW block core. The message decoding and processing logic thus may perform arbitration and execution of messages. For outgoing messages that should be sent out via the control interface 104, the message decoding and processing logic 320 may perform arbitration and handshake with the control interface 104. Messages may have different mail types, one or more of which may be executed through a separated queue. While such a mail is executed, the mail box may be halted.

To this end, the message decoding and processing logic 320 may provide different subroutines each operable to provide functionality for different types of messages. For example, the message decoding and processing block may comprise an arbiter function that is operable to choose which message should be executed next. It may keep track of which mail box is suspended due to execution of a mail of a certain type. The message decoding and processing logic 320 may further comprise a message execution function operable to execute messages forwarded to it by the arbiter function or to cause execution by respective subroutines. The message decoding and processing logic 320 may further comprise a core-start/core-event logic operable to handle core-start/core-event handshakes with the HW block core and to keep track of which message mail boxes may be suspended due to a core start, thus synchronising operation of the HW block core and the interface module.

It will be appreciated that some embodiments of an interface module may comprise more than one message decoding and processing logic blocks, e.g. for providing multi-threaded processing. Each message decoding and processing logic block may be connected to a respective mail box for queuing incoming messages.

The message decoding and processing block is connected to one or more core interfaces operable to provide an interface between the interface module and the HW block core of the HW block in which the interface module resides. In the example of FIG. 3, the interface module comprises a core interface 316 for communicating a start control signal to the HW block core and for receiving event signals from the HW block core. The interface module further comprises a set of I/O registers 317 for communicating parameters to/from the HW block core. The message decoding and processing block has an interface allowing read/write operations of the registers.

The interface module 101 further comprises an outgoing message handler 321 operable to handle outgoing messages. The outgoing message handler 321 is connected to a master port of the control interface 104 and to the message decoding and processing block 320.

The data interface 106 is likewise connected to the message decoding and processing block 320. The data interface 106 provides an interface to a memory system from which configuration parameters for the HW block and/or messages may be read. The data interface may include a FIFO buffer allowing the interface module to read and queue a plurality of messages from the memory system.

Generally, the interface module may be operable to process control messages of different types. For example, the messages may include IO read mails, IO Write mails, memcopy mails, and so-called jobmails. The message decoding and processing logic may thus be operable to determine the mail type of an incoming message and process the message accordingly.

For example, an IO Read mail may cause the interface module to read data from the IO register 317 and to generate and send via the send handler 321 a message including the read parameters to an address specified in the incoming Read IO mail. The message decoding and processing block may extract the register to be read, the response mail type, the response destination and the response address. The message decoding and processing block may further read the registers from the IO register 317 and assemble the response mail.

Similarly, an IO Write mail may cause the interface module to write parameters included in the mail into the IO register 317. The message decoding and processing block 320 may extract the registers to write, the write address and the data to be written.

The Memcopy mails may cause the message decoding and processing block to copy register content between the common memory and the IO register.

Hence, the above functions allow an efficient configuration of the HW block and the writing of configuration parameters into memory and/or sending of control messages to other HW blocks.

A message of type job mail may cause the interface module to read a number of messages from the memory system via data interface 106. The job mail may include information about the memory address from which the messages are to be read and the number of messages to be read. Multiple messages may be read from memory and queued in the data interface 106. The message decoding and processing block may then read the queued messages from the data interface one by one. For each message, the message decoding and processing block 320 may initially perform a pre-execution step including the setting of configuration parameters in the IO register 317. Subsequently, the message decoding and processing block may send a core-start signal to the HW block core via interface 316 causing the HW block core to start execution based on the register contents of the IO register 317. The message decoding and processing block may then await an event signal from the HW block core via the interface 316, indicating that the HW block core execution is done.

Responsive to the receipt of this event, the data decoding and processing block may either perform another pre-execution step responsive to the next message, or perform a post-execution step, in which the message decoding and processing block reads a message, e.g. of type jobmail, from the data interface and sends it via the send handler 321 and the control interface 104 to another hardware block connected to the control bus 212.

Hence, embodiments of the interface module described in connection with FIGS. 1-3 provide a flexible, reconfigurable system and a low interrupt intensive system. In particular, as the interface module is configured to start the execution of the HW block, to receive a response when done, and to direct outgoing messages to other logic circuit blocks, a low interrupt intensive system is provided. When one HW block is finished the interface module can start the next HW block based on configuration data in memory but without any need for SW involvement.

Although some embodiments have been described and shown in detail, the invention is not restricted to them, but may also be embodied in other ways within the scope of the subject matter defined in the following claims.

For example, it will be appreciated that the individual functions of the components of the interface module described in connection with FIG. 3 may be distributed among the shown components in a different way and/or among alternative or additional components. Similarly, even though embodiments of the interface module have mainly been described with reference to a control bus with master and slave port, it will be appreciated that alternative embodiments of the interface module may comprise a different type of control interface for providing an interface to a different type of control bus as long as they include capabilities to both send and receive messages on the control interface, e.g. a AMBA APB, AMBA AHB, AMBA AXI, ring bus or other proprietary or non-proprietary control buses.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An interface circuit for a logic circuit block, the logic circuit block comprising a processing circuit implemented as a hardware block core, the interface circuit comprising:
   a control interface configured to send and receive one or more control messages;
   a data interface configured to access a data storage device;
   an interface logic block connected to the control interface and to the data interface;
   a core interface connected to the processing circuit, and also connected to the interface logic block for communication between the interface logic block and the processing circuit;
   wherein the interface logic block is configured to:
      receive one or more incoming control messages via the control interface;
      process the one or more control messages, the processing including accessing the data storage device via the data interface, initiating processing by the processing circuit via the core interface, and receiving one or more signals from the processing circuit via the core interface;
      output one or more outgoing control messages to another logic circuit block or a software block via the control interface after reception of the one or more signals from the processing circuit and responsive to configuration parameters read from the data storage device in response to the one or more received incoming control messages.

2. The interface circuit of claim 1, wherein the interface circuit is further configured to:
   read one or more configuration parameters for configuring the logic circuit block from the data storage device via the data interface;
   configure, via the core interface, the logic circuit block responsive to a control message received via the control interface by the interface circuit.

3. The interface circuit of claim 1, wherein the interface circuit is further configured to send data via the control interface, the data comprising information read from the data storage device via the data interface.

4. The interface circuit of claim 1, wherein the interface circuit is configured to activate the processing circuit responsive to a receipt of a control message addressed to the logic circuit block.

5. The interface circuit of claim 1, further comprising one or more buffers configured to queue control messages addressed to the logic circuit block and received via the control interface.

6. The interface circuit of claim 1, further comprising an address decoding logic block configured to determine whether a received control message is addressed to the logic circuit block.

7. The interface circuit of claim 6, further comprising:
   one or more buffers configured to queue control messages addressed to the logic circuit block;
   wherein the address decoding logic block is configured to forward control messages addressed to the logic circuit block to one of the one or more buffers.

8. The interface circuit of claim 7, wherein the interface logic block comprises a message body decoding block configured to read one or more control messages from the one or more buffers and to process the one or more read control messages.

9. The interface circuit of claim 8, wherein the message body decoding block is configured to decode a plurality of message types including messages of a first type causing the interface logic block to read data from a register, messages of a second type causing the interface logic block to write data to a register of the logic circuit block, and messages of a third type causing the interface logic block to read one or more control messages from the data storage device via the data interface.

10. The interface circuit of claim 1 wherein the control interface comprises a control interface to a control bus comprising a master port and a slave port.

11. A logic circuit block comprising:
a processing circuit implemented as a hardware block core;
an interface circuit comprising:
- a control interface configured to send and receive one or more control messages;
- a data interface configured to access a data storage device;
- an interface logic block connected to the control interface and to the data interface;
- a core interface connected to the processing circuit, and also connected to the interface logic block for communication between the interface logic block and the processing circuit;

wherein the interface logic block is configured to:
- receive one or more incoming control messages via the control interface;
- process the one or more control messages, the processing including accessing the data storage device via the data interface, initiating processing by the processing circuit via the core interface, and receiving one or more signals from the processing circuit via the core interface;
- output one or more outgoing control messages to another logic circuit block or a software block via the control interface after reception of the one or more signals from the processing circuit and responsive to configuration parameters read from the data storage device in response to the one or more received incoming control messages.

12. The logic circuit block of claim 11, wherein the logic circuit block is included in a processing device.

13. A processing device comprising:
a processing unit configured to execute program code;
a control bus connected to the processing unit;
a data storage device connected to the processing unit;
one or more logic circuit blocks, each logic circuit block being connected to the control bus and to the data storage device, and comprising:
- a processing circuit implemented as a hardware block core;
- an interface circuit comprising
  - a control interface configured to send and receive one or more control messages;
  - a data interface configured to access the data storage device;
  - an interface logic block connected to the control interface and to the data interface;
  - a core interface connected to the processing circuit, and also connected to the interface logic block for communication between the interface logic block and the processing circuit;

wherein the interface logic block is configured to:
- receive one or more incoming control messages via the control interface;
- process the one or more control messages, the processing including accessing the data storage device via the data interface, initiating processing by the processing circuit via the core interface, and receiving one or more signals from the processing circuit via the core interface;
- output one or more outgoing control messages to another logic circuit block or a software block via the control interface after reception of the one or more signals from the processing circuit and responsive to configuration parameters read from the data storage device in response to the one or more received incoming control messages.

14. The processing device of claim 13, wherein the one or more logic circuit blocks comprises at least a first and a second logic circuit block, and each logic circuit block being connected to the control bus and to the data storage device, wherein the interface circuit of the first logic circuit block is configured to:
- read, responsive to a receipt of a control message, configuration data from the data storage device and to configure the logic circuit block based on the read configuration data;
- initiate processing of the processing circuit;
- receive a signal from the processing circuit indicating that the processing circuit has finished the processing;
- send, via the control interface of the interface circuit of the first logic circuit block, a control message to the second logic circuit block.

15. The processing device of claim 13, wherein the processing device is a mobile terminal.

* * * * *